Oct. 22, 1940.     H. BANY     2,219,172
CONTROL SYSTEM
Filed May 17, 1939
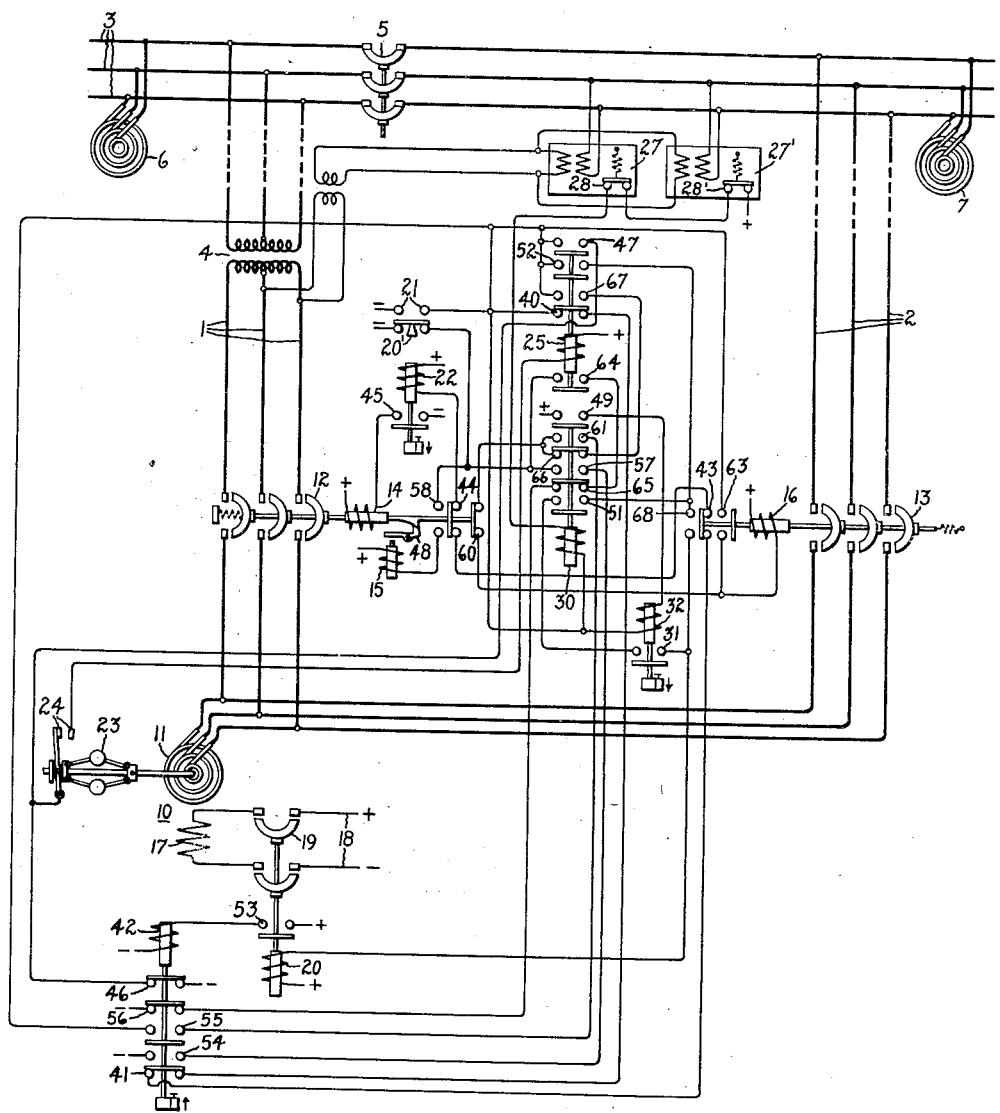
Inventor:
Herman Bany,
by Harry E. Dunham
His Attorney.

Patented Oct. 22, 1940

2,219,172

UNITED STATES PATENT OFFICE 2,219,172

CONTROL SYSTEM

Herman Bany, Lansdowne, Pa., assignor to General Electric Company, a corporation of New York Application May 17, 1939, Serial No. 274,268

10 Claims. (Cl. 172—289)

My invention relates to control systems and particularly to systems for controlling the application of excitation to a synchronous machine to pull it into synchronism.

In some cases a synchronous machine, such as a synchronous motor, condenser and the like, is started by connecting the machine to a source of relatively low starting voltage with the field winding of the machine unexcited. When the machine has accelerated in this manner to a predetermined speed, the field winding of the machine is then excited with direct current to pull the machine into synchronism and then the machine is transferred to a source of relatively high running voltage. Such an arrangement is satisfactory as long as the phase difference between the voltages of the starting and running voltage sources remains within a predetermined range. In case the two sources should, for any reason, get out of synchronism, such a synchronizing arrangement might result in serious damage to the synchronous machine due to it being connected to the running source at an instant when the voltages of this source and the excited machine are materially out of phase.

One object of my invention is to provide in such a starting arrangement for a synchronous machine a control arrangement which will not permit such a transfer of the machine from the starting source to the normal running source with the field winding of the machine excited when the starting and running voltage sources are not in synchronism.

In accordance with my invention, I provide a control arrangement in which the field winding of the machine is excited with direct current while the machine is connected to the starting source if the starting and running sources are in synchronism and is not excited with direct current until after the transfer to the running source has been made if the two sources are not in synchronism.

My invention will be better understood from the following description when taken in connection with the accompanying drawing the single figure of which diagrammatically represents a synchronous motor control system embodying my invention and its scope will be pointed out in the appended claims.

In the accompanying drawing 1 represents a relatively low voltage circuit and 2 represents a relatively high voltage circuit. The low voltage circuit 1 is connected to a relatively high voltage circuit 3 through suitable voltage reducing means 4, such as a transformer, and the two relatively high voltage circuits 2 and 3 are normally connected together by a tie breaker 5 so that the voltages of the two circuits 1 and 2 are normally in synchronism. Sources of current 6 and 7 are shown connected to the high voltage circuits 3 and 2, respectively.

10 represents a synchronous motor, the armature winding 11 of which is arranged to be connected to the relatively low voltage circuit 1 by means of a suitable switch 12 and to the relatively high voltage circuit 2 by means of a suitable switch 13. As shown in the drawing, switch 12 is of the latched closed type having a closing coil 14 and a trip coil 15 whereas the switch 13 is shown as a contactor having a closing coil 16. The field winding 17 of the synchronous motor 10 is arranged to be connected to a suitable source of excitation 18 by means of a field switch 19 having a closing coil 20.

For effecting the closing of the switch 12 when it is desired to start the motor 10, I provide a manually operated switch 20' which, when operated so as to close its contacts 21, completes an energizing circuit for a control relay 22 if the motor speed is below a predetermined value and the field switch 19 and the switches 12 and 13 are open. The relay 22, when energized, completes an energizing circuit for the closing coil 14 of the switch 12. Any suitable speed responsive means, examples of which are well known in the art, may be provided for indicating that the speed of the motor 10 is above a predetermined value. In the particular arrangement shown in the drawing the motor 10 is provided with a centrifugally operated speed switch 23 which is arranged to close its contacts 24 when the motor speed is above a predetermined value. The closing of the contacts 24 completes an energizing circuit for an associated control relay 25.

In accordance with my invention, the sequence in which the field switch 19 and the running switch 13 are closed after the motor 10 has accelerated to a speed sufficient to effect the operation of the speed controlled relay 25 depends upon whether or not the voltages of the circuits 1 and 2 are in synchronism. For indicating that the voltages of the circuits 1 and 2 are in synchronism, I provide two phase relays 27 and 27' which are energized from the circuits 1 and 2 in any well known manner so that their respective contacts 28 and 28' are closed only when predetermined voltages of the two circuits are within different predetermined phase ranges.

By properly calibrating the relays 27 and 27', the simultaneous closure of the contacts 28 and 28' can be made to occur during any desired predetermined phase range of the voltages of the circuits 1 and 2. Preferably the phase range during which the contacts 28 and 28' are simultaneously closed is made sufficiently broad to include the phase range over which these voltages vary due to variations in load while the two circuits remain in synchronism. When both of the contacts 28 and 28' are simultaneously closed, an energizing circuit is completed for a control relay 30 if the contacts 21 of switch 20' are closed. Therefore, as long as the two circuits 1 and 2 are in synchronism, relay 30 is energized. When, however, the two circuits 1 and 2 are out of synchronism due, for example, to the opening of the tie breaker 5, either the contacts 28 or 28' or both are open during that portion of each slip cycle when the voltages of the two circuits are outside the above-mentioned predetermined angle, and consequently the relay 30 is deenergized during that portion of each slip cycle.

In the particular embodiment of my invention shown, if the relay 30 remains energized for a predetermined time interval after the speed controlled relay 25 becomes energized in response to the motor 11 reaching a predetermined speed, a circuit is completed for the closing coil 20 of the field switch 19 so that the field winding 17 is connected to the source of excitation 18 to pull the motor into synchronism. The closing of the field switch 19 also effects, after a predetermined interval, the energization of the trip coil 15 of the switch 12 and the subsequent energization of the closing coil 16 of the switch 13 so that the armature winding 11 is transferred from the relatively low voltage starting circuit 1 to the normal running circuit 2. If, when the speed controlled relay 25 becomes energized, the relay 30 is deenergized, a circuit is completed for the trip coil 15 to effect the opening of the switch 12. A circuit is then completed for the closing coil 16 of the switch 13 so that the motor armature winding 11 is transferred to the circuit 2 and then a circuit is completed for the closing coil 20 of the field switch 19 so that the field winding 17 is energized to pull the motor into synchronism.

In order to insure that the voltages of the two circuits 1 and 2 have the correct phase relationship when the motor armature winding 11 is transferred from the circuit 1 to the circuit 2 with the field switch 19 closed, I also include in the energizing circuit of the closing coil 20 of the field switch 19, which is closed by the relay 30 when it is energized, the contacts 31 of a time relay 32. This time relay 32 is connected so that it is controlled by the relay 30 in such a manner that the contacts 31 are not closed until after the phase relation between the voltages of circuits 1 and 2 is such that the relay 30 has remained in its energized position for a predetermined time thereby insuring that the frequency difference between the two circuits 1 and 2 is substantially zero.

The operation of the arrangement shown in the drawing is as follows:

When it is desired to start the motor 10, the control switch 20' is operated so that its contacts 21 are closed thereby completing an energizing circuit for the control relay 22. This energizing circuit also includes the contacts 40 of the relay 25, contacts 41 of a control relay 42, contacts 43 of the switch 13 and contacts 44 of the switch 12. The closing of the contacts 45 of control relay 22 completes an energizing circuit for the closing coil 14 of the switch 12 so that the armature winding 11 of the motor 10 is connected to the low voltage starting circuit 1. The opening of the contacts 44 of the switch 12, when it closes, effects the deenergization of the control relay 22 which, after a predetermined time interval, interrupts the energizing circuit of the closing coil 14. The switch 12, however, is maintained in its closed position by the latch 48.

As soon as the switch 12 closes, the motor 10 begins to accelerate as an induction motor, and when it reaches a predetermined speed near synchronous speed, the speed switch 23 closes its contacts 24 and completes through the contacts 46 of the relay 42 an energizing circuit for the control relay 25. By closing its contacts 47 relay 25 completes a locking circuit for itself through the contacts 21 of the control switch 20'.

If the voltages of the circuits 1 and 2 are in synchronism when the control switch 20' is operated so as to close its contacts 21, an energizing circuit is completed for the control relay 30 through contacts 28 of relay 27, contacts 28' of relay 27' and contacts 21 of the control switch 20'. By closing its contacts 49 the control relay 30 completes an energizing circuit for the time relay 32 which closes its contacts 31 if the frequency difference between the voltages of the circuits 1 and 2 is so small that the control relay 30 remains in its energized position for a predetermined time interval.

If the relays 30 and 32 are in their energized positions when the relay 25 becomes energized in response to the operation of the speed control switch 23, an energizing circuit is completed for the closing coil 20 of the field switch 19 through the contacts 31 of relay 32, contacts 51 of relay 30, contacts 52 of relay 25 and contacts 21 of control switch 20'. The closing of the field switch 19 connects the field winding 17 to the source of excitation 18 so that the motor 10 is pulled into synchronism. The closing of the auxiliary contacts 53 of the field switch 19 completes an energizing circuit for the associated control relay 42 which, after being energized for a predetermined time, effects the closing of its contacts 54 and 55 and the opening of its contacts 41, 46 and 56. The closing of the contacts 54 of the relay 42 completes through the contacts 57 of the relay 30 and the auxiliary contacts 58 of the switch 12 an energizing circuit for the trip coil 15 so as to release the latch 48 and effect the opening of the switch 12. The closing of the auxiliary contacts 60 of the switch 12 completes an energizing circuit for the closing coil 16 of the switch 13. This energizing circuit also includes the contacts 61 of the relay 30, contacts 55 of the control relay 42 and the contacts 21 of the control switch 20. The closing of the switch 13 connects the armature winding 11 of the motor 10 to the relatively high voltage circuit 2. The closing of the auxiliary contacts 63 completes a locking circuit for the closing coil 16 through the contacts 21 of the control switch 20'.

Therefore, it will be seen that if the relays 30 and 32 are in their energized positions when the relay 25 becomes energized the field switch 19 is closed before the motor armature winding 11 is transferred from circuit 1 to circuit 2.

If at the instant when the relay 25 becomes energized in response to the operation of the speed control switch 23, the relays 30 and 32 are deenergized due to the circuits 1 and 2 being out of synchronism, the closing of the contacts 64 of the relay 25 completes an energizing circuit for the trip coil 15 of the switch 12. This circuit also includes the auxiliary contacts 58 of the switch 12, contacts 65 of the relay 30 and the contacts 56 of the control relay 42. The energization of the trip coil 15 effects the opening of the switch 12 so that the armature winding 11 is disconnected from the circuit 1. The closing of the contacts 60 of the switch 12, when it opens under these conditions, completes an energizing circuit for the closing coil 16 of the switch 13 through the contacts 66 of the relay 30, contacts 67 of relay 25 and the contacts 21 of the control switch 20'. The energization of the closing coil 16 effects the closing of the switch 13 so that the armature winding 11 is connected to the relatively high voltage circuit 22. The closing of the auxiliary contacts 63 of the switch 13 completes the above-traced described holding circuit for the closing coil 16, and the closing of the auxiliary contacts 68 of the switch 13 completes an energizing circuit for the closing coil 20 of the field switch 19 through contacts 52 of the relay 25 and the contacts 21 of the control switch 20'. The closing of the field switch 19 causes the motor 10 to pull into synchronism.

Therefore, if the relays 30 and 32 are de-energized when the relay 25 becomes energized, the motor armature winding 11 is transferred from the circuit 1 to the circuit 2 before the field switch 19 is closed.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, two alternating current circuits, a synchronous machine having a field winding, means for connecting said machine to one of said circuits and then transferring said machine to the other circuit, and means controlled by a predetermined electric condition of said circuits for effecting the application of direct current to said field winding prior to said transfer if said predetermined electric condition exists and for effecting the application of direct current to said field winding only after said transfer if said predetermined electric condition does not exist.

2. In combination, two alternating current circuits of the same frequency, a synchronous machine having a field winding, means for connecting said machine to one of said circuits and then transferring said machine to the other circuit, and means for effecting the application of direct current to said field winding prior to said transfer if said circuits are in synchronism and not until after said transfer if said circuits are not in synchronism prior to said transfer.

3. In combination, a starting circuit, a running circuit, a synchronous machine having a field winding, means for connecting said machine to said starting circuit with said field winding unexcited, means dependent upon a predetermined operating condition of said machine while connected to said starting circuit for effecting the transfer of said machine from said starting circuit to said running circuit, and means for effecting the application of direct current to said field winding prior to said transfer if said circuits are in synchronism and not until after said transfer if said circuits are not in synchronism.

4. In combination, a relatively low voltage circuit, a relatively high voltage circuit, a synchronous machine having a field winding, means for connecting said machine to said low voltage circuit with said field winding unexcited, means controlled by the speed of said machine, means responsive to the frequency difference between said circuit, and means controlled by said speed controlled means and said frequency difference responsive means for effecting the application of direct current to said field winding and the subsequent transfer of said machine from said relatively low voltage circuit to said relatively high voltage circuit if said circuits are in synchronism when said machine is operating at a predetermined subsynchronous speed and for effecting the transfer of said machine from said relatively low voltage circuit to said relatively high voltage circuit and the subsequent application of direct current to said field winding if said circuits are not in synchronism when said machine is operating at said predetermined subsynchronous speed.

5. In combination, a relatively low voltage circuit, a relatively high voltage circuit, a synchronous machine having a field winding, means for connecting said machine to said low voltage circuit with said field winding unexcited, means controlled by the speed of said machine, means responsive to a predetermined phase relation between the voltages of said circuits, and means for effecting the application of direct current to said field winding and the subsequent transfer of said machine from said relatively low voltage circuit to said relatively high voltage circuit if said predetermined phase relation exists when said machine is operating at a predetermined subsynchronous speed and for effecting the transfer of said machine from said relatively low voltage circuit to said relatively high voltage circuit and the subsequent application of direct current to said field winding if said predetermined phase relation does not exist when said machine is operating at said predetermined subsynchronous speed.

6. In combination, a relatively low voltage circuit, a relatively high voltage circuit, a synchronous machine having a field winding, a switch for connecting said machine to said low voltage circuit, a second switch for connecting said machine to said high voltage circuit, a source of excitation, a field switch for connecting said source to said field winding, means for closing said first mentioned switch, means controlled by the speed of said machine, means responsive to a predetermined phase relation between the voltages of said circuit, means controlled by said speed controlled means and said phase relation responsive means for effecting the closing of said field switch when said machine is operating at a predetermined speed and said circuits are in synchronism, means responsive to the closing of said field switch when said circuits are in synchronism for effecting the opening of said first mentioned switch and the closing of said second switch, means controlled by said speed controlled means and said phase relation responsive means for effecting the opening of said first mentioned switch and the closing of said second switch when said machine is operating at said predetermined speed and said circuits are not in synchronism, and means responsive to the closing of said second switch when said circuits are not in synchronism for effecting the closing of said field switch.

7. In combination, two alternating current circuits, a synchronous machine having a field winding, means for connecting said machine to one of said circuits and then transferring said machine to the other circuit, and means controlled by a predetermined electric condition of said circuits for effecting the application of direct current to said field winding prior to said transfer if the voltages of said circuits are within a predetermined phase range and only after said transfer if said voltages are not within said predetermined phase range prior to said transfer.

8. In combination, two alternating current circuits, a synchronous machine having a field winding, means for connecting said machine to one of said circuits and then transferring said machine to the other circuit, and means controlled by a predetermined electric condition of said circuits for effecting the application of direct current to said field winding prior to said transfer if the voltages of said circuits remain within a predetermined phase range for a predetermined time interval and only after said transfer if said voltages do not remain within said predetermined phase range for said predetermined time interval prior to said transfer.

9. In combination, two alternating current circuits, an alternating current machine, means for starting said machine from one of said circuits, and means dependent upon a predetermined electric condition of said circuits for effecting the establishment of running connections between said machine and the other of said circuits by a predetermined sequence of operations when said predetermined electrical condition exists and by a different predetermined sequence of operations when said condition does not exist.

10. In combination, an alternating current motor, starting and running circuits for said motor, starting connections for said motor including said starting circuit, running connections for said motor including said running circuit, and means for effecting the transfer from said starting connections to said running connections by a predetermined sequence of operations when a predetermined electrical condition of said circuits exists and by a different predetermined sequence of operations when said condition of said circuits does not exist.

HERMAN BANY.